Patented Dec. 27, 1949

2,492,930

UNITED STATES PATENT OFFICE 2,492,930

EMULSION POLYMERIZATION OF UNSATURATED ORGANIC COMPOUNDS

Arthur E. Drake, Hockessin, Del., assignor to Hercules Powder Company, Wilmington, Del., a corporation of Delaware No Drawing. Application February 28, 1946, Serial No. 651,036

14 Claims. (Cl. 260—82.3)

This invention relates to an improved process for the emulsion polymerization of unsaturated compounds and more particularly to an improved process of polymerizing vinyl, vinylidene and vinylene compounds to provide improved synthetic rubberlike materials.

It is well known that unsaturated compounds, particularly those containing the vinyl group, may be advantageously polymerized in aqueous emulsion. Synthetic rubberlike materials have been prepared using the emulsion technique by polymerizing diolefins, halogen derivatives of diolefins or other substituted diolefins, or by interpolymerizing diolefins with other compounds containing a vinyl group such as styrene, acrylic acid esters and acrylic acid nitrile. Polymers such as polyvinyl halides, polyvinyl acetate, polystyrene, polymethyl methacrylate and various other addition polymers also have been prepared by polymerization in aqueous emulsion. Soaps of fatty acids have been the most commonly used emulsifying agents for polymerization of this type, and the emulsions have been alkaline due to the presence of the fatty acid soaps. Similar polymerizations, however, have been carried out in acidic emulsions utilizing aliphatic amine salts, such as dodecyl amine acetate, as emulsifying agents.

Although effective emulsifying agents for the polymerization of vinyl compounds, fatty acid soaps, due to their limited water solubility, are quite difficult to remove from the polymerization products. The presence of fatty acids in the polymer often is disadvantageous, but their complete removal is quite difficult. Furthermore, the length of time required to reach a satisfactory degree of polymerization when using fatty acid soaps is quite extensive. By carrying out the polymerizations in an acidic emulsion using aliphatic amine salts as emulsifying agents the length of time involved in polymerization is considerably reduced but the use of these salts has several disadvantages. Difficulty is often encountered in their use because of nonuniformity of the amines. Furthermore, these amines are relatively high in cost.

Now in accordance with this invention it has been found that the water-soluble salts of an amine selected from the group consisting of hydroabietylamine and dehydroabietylamine may be used as emulsifying agents with very advantageous effects for the polymerization of vinyl compounds which are capable of being polymerized by a perioxide catalyst, the polymer resulting from this process having satisfactory plasticity, elongation at break, tear strength and tack.

The water-soluble salts of hydroabietylamine and dehydroabietylamine have been found to be excellent emulsifying agents in the preparation of polymers by emulsion polymerization. The salts reduce the polymerization time considerably in comparison to the length of time involved using fatty acid soaps. Furthermore these salts produce polymers which contain less benzene-insoluble material, or gel, and which may be cured in a shorter length of time than those polymers produced through utilization of fatty acid or modified rosin acid soaps as emulsifying agents.

The following examples are illustrative of the preparation of polymers by emulsion polymerization and the products thereof in accordance with this invention. All parts given in the examples represent parts by weight.

Example I

Two and one-half parts of dehydroabietylamine was charged into a glass polymerization vessel and neutralized with dilute aqueous acetic acid. The pH of the resulting solution was 5.6. To this solution 0.15 part potassium persulfate, 0.25 part lauryl mercaptan, 37.5 parts of butadiene-1,3 and 12.5 parts of styrene were added. The reaction mixture contained 90 parts water by virtue of the aqueous acetic acid and additional water if needed. The polymerization vessel then was sealed and the reaction mixture agitated at 50° C. for 9 hours. The polymerizate emulsion was then run into an open vessel containing 5 parts of a 2% solution of phenyl β-naphthylamine, stripped of the excess butadiene and styrene and the polymer precipitated by the addition of an excess of a saturated salt solution. The precipitated polymer was washed with water until the washings were neutral, then with alcohol and finally was dried to constant weight in an oven. A yield of 74.4% polymer was obtained.

Example II

Two and one-half parts of dehydroabietylamine was charged into a glass polymerization vessel and neutralized with dilute aqueous hydrochloric acid. The pH of the resulting solution was 4.4. From this point on the procedure of Example I was followed, resulting in a yield of 75.4% polymer.

Example III

Two and one-half parts of hydroabietylamine was charged into a glass polymerization vessel and neutralized with dilute aqueous acetic acid. The procedure of Example I then was followed resulting in a yield of 78.0% polymer.

*Example IV*

Utilizing dehydroabietylamine acetate as the emulsifying agent, the general procedure of Example I was followed in the polymerization of 50 parts styrene as the sole monomer with the exceptions that no mercaptan was included in the formulation and that a polymerization time of 14 hours was utilized. A 100% yield of polystyrene was obtained.

*Example V*

Utilizing dehydroabietylamine acetate as the emulsifying agent, the general procedure of Example I was followed in the polymerization of 50 parts of butadiene-1,3 as the only monomer with the exception that a polymerization time of 14 hours was used. A yield of 72.2% polymer was obtained.

*Example VI*

Following the procedure of Example V, 50 parts methyl methacrylate as the sole monomer was polymerized, affording a yield of 100% polymer.

*Example VII*

Twelve and one-half parts acrylonitrile and 37.5 parts butadiene-1,3 were copolymerized according to the procedure set forth in Example V. A yield of 91.8% was obtained.

*Example VIII*

Twelve and one-half parts styrene and 37.5 parts isoprene were copolymerized following the procedure set forth in Example V, affording a yield of 51.4% polymer.

When the procedure of Example I was followed using as emulsifying agent the salt prepared by neutralizing N wood rosin amine with dilute aqueous hydrochloric acid, no polymer was obtained, nor was any polymer obtained when the reaction period was extended to 11.5 hours.

The polymers prepared according to Examples I and III were compounded according to the following formula: 100 parts polymer, 1 part stearic acid, 1.8 parts N-cyclohexyl-2-benzothiazole sulphenamide, 5 parts zinc oxide, 50 parts channel black, and 1 part sulfur. The compounded polymers then were cured at a temperature of 138° C. Only 30 minutes were required to obtain optimum cure as compared to the 60 minutes usually required in curing commercial butadiene-styrene copolymers. The mechanical properties after cure of the polymers prepared according to Examples I and III compared satisfactorily with those found in commercial butadiene-styrene copolymers.

The water-soluble salts of hydroabietylamine and dehydroabietylamine described in accordance with this invention are prepared by neutralization of the amines with any mineral or organic acid which will provide a water-soluble product. Mineral acids such as hydrochloric and sulfuric acids may be used, and acetic acid is exemplary of an organic acid which is operable. The salts may be prepared in situ, i. e. the amine may be added to the polymerization vessel and an aqueous solution of the appropriate acid added, or the salt may be prepared as such and then added to the polymerizate mixture containing water. Complete neutralization of the amines is desirable, since the partially neutralized amines when used as emulsifying agents resulted in lower polymer yields.

The hydroabietyl and dehydroabietylamines utilized in accordance with this invention are ultimately derived from hydrogenated rosin and dehydrogenated rosin respectively. The hydrogenated rosin is prepared by contacting a natural rosin or rosin acid in a fluid state with hydrogen in the presence of an active hydrogenation catalyst. Thus, when an active base metal hydrogenation catalyst such as activated nickel, Raney nickel, copper chromite, cobalt, etc., is used, the reaction is carried out under a pressure of about 200 to 15000 pounds per square inch and at a temperature of about 125° C. to about 225° C. for about 0.5 hour to about 5 hours. A highly active platinum or platinum oxide catalyst may also be employed, in which case the reaction is usually carried out at room temperature under relatively low pressure and in the presence of an inert reaction medium such as acetic acid. Many other variations of the hydrogenation reaction may be utilized.

The dehydrogenated rosin is obtained by the dehydrogenation or disproportionation of natural rosin or a rosin material containing a substantial amount of a natural rosin, such as gum or wood rosin. The dehydrogenation or disproportionation reaction is carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite, etc., are suitable. The catalysts may be supported on a carrier such as granular alumina, fibrous asbestos or activated charcoal. Dehydrogenation or disproportionation with a palladium catalyst, for example, may be conducted either by a batchwise or continuous procedure. Thus the rosin may be agitated with about 5% to about 20% by weight of a palladium catalyst supported on activated carbon (1–2% palladium) at about 150° C. to about 300° C. for about 1 hour to about 5 hours. In the continuous process molten rosin flows over the supported palladium catalyst at a temperature within the range of about 225° C. to about 300° C. to provide a contact time of about ¼ hour to about 1 hour.

The natural rosin may be refined by any means such as by crystallization, by means of a selective solvent such as furfural or phenol, or by an absorbent earth prior to the hydrogenation or dehydrogenation reaction. The hydrogenated or dehydrogenated rosins also may be refined by distillation or other means prior to their conversion to the corresponding nitriles, this conversion being the next step in the transformation to hydroabietyl- and dehydroabietylamines.

The nitriles from which the amines are prepared are obtained by heating the hydrogenated or dehydrogenated rosins or the pure acids thereof with ammonia. The reaction may be carried out by passing gaseous ammonia into the molten rosin material and vaporizing the water as fast as it is formed in order to remove the water from the reaction mixture. They also may be prepared by heating the rosin material with ammonia in the presence of a dehydration catalyst. The nitriles then should be purified by neutralization and distillation before subjecting them to hydrogenation in order to produce the hydroabietyl and dehydroabietylamines which in the form of their water-soluble salts are used as the emulsifying agents in accordance with this invention.

The hydrogenation of the resin acid nitriles may be carried out either in the presence or in the absence of ammonia since the presence of ammonia is not necessary in the hydrogenation of resin acid nitriles to prevent the formation of secondary amines. Any active hydrogenation catalyst may be used for the hydrogenation reaction. Active base metal catalysts such as nickel, cobalt, Raney nickel, Raney cobalt, etc., or noble metal catalysts such as active platinum, palladium, palladium on carbon or reduced platinum oxide are operable. The latter class of catalysts, however, tend to give somewhat lower yields of product than the nickel or cobalt catalysts. In any event, the nitrile to be hydrogenated should be essentially free of resin acids to prevent destruction of the catalyst and also to prevent color in the product and a lower yield.

The hydrogenation of the nitrile may be carried out in a batch or continuous process. In the batch process, about 5% to 20% wet-weight of the catalyst based on the nitrile should be used. The hydrogenation reaction may be carried out at pressures from about 200 to about 8000 pounds per square inch. When using a Raney nickel or Raney cobalt catalyst a pressure of about 2000 to about 3000 pounds per square inch is usually preferable. The temperatures during hydrogenation may be from about 20° C. to about 200° C. The amine may be recovered and purified by conventional procedures.

The amine prepared from the nitrile of hydrogenated rosin is a mixture of dihydroabietylamine and tetrahydroabietylamine since hydrogenated rosin is a mixture of hydrorosin acids. The proportion of the dihydro derivative to the tetrahydro derivative is dependent upon the degree of hydrogenation of the rosin in the preparation of the hydrogenated rosin. If either the pure dihydroabietylamine or tetrahydroabietylamine is desired, they may be separated from the mixture or they may be prepared by the hydrogenation of the corresponding di- or tetra-hydroabietonitrile. In the same way pure dehydroabietylamine may be prepared by the hydrogenation of pure dehydroabietonitrile.

Compounds which may be advantageously polymerized in aqueous emulsion by means of the water-soluble salts of hydroabietylamine and dehydroabietylamine include the conjugated butadiene hydrocarbons, butadiene and its derivatives, such as isoprene, dimethyl butadiene, chloroprene, etc., and other compounds containing the vinyl group such as styrene, acrylonitrile and the like. These water-soluble amine salts also have been found to be excellent emulsifying agents, particularly in the preparation of the copolymers of butadiene and styrene or acrylonitrile, isoprene and styrene or acrylonitrile, and other rubberlike copolymers, as well as in the preparation of polymers such as polyvinyl chloride, polyvinyl acetate, polystyrene, polymethyl methacrylate, polyvinylidene chloride and the various other addition polymers which may be prepared by the emulsion technique.

The polymerizations in which the water-soluble salts of hydroabietylamine and dehydroabietylamine are used may be subjected to the same variations in the reaction conditions, e. g. concentration of reactants, temperature pressure, etc., as those in which fatty acid soaps are used. The temperature of the reaction may vary from about 20° C. to about 100° C., preferably from about 30° C. to about 70° C. One of the most useful temperature ranges is from about 40° C. to about 60° C. and a particularly applicable temperature is about 50° C. In the aqueous emulsifying solution the concentration of the amine salt emulsifying agent may be varied from about 1% to about 5%, preferably from about 2% to about 3%. The polymerization in general is carried out with the use of a peroxide catalyst such as potassium persulfate, ammonium persulfate, hydrogen peroxide, tert-butyl hydroperoxide, benzoyl peroxide, etc. The water-soluble amine salts of this invention may also be used in combination with any desired initiator or other polymerization or processing aid. It is desirable that a mercaptan modifier be included during the polymerization since, although the absence of a modifier has no appreciable effect on the yield in the case of rubberlike copolymers, the polymer is more brittle and less rubberlike, and contains an appreciable amount of benzene-insoluble material, or gel.

The use of the water-soluble salts of hydroabietylamine and dehydroabietylamine in accordance with this invention is highly desirable. Through their use it is possible to obtain a corresponding polymer yield in much less time than is required when using fatty acid soaps. Furthermore the resulting polymers are not as greatly subject to gel formation and may be more easily cured. It is, therefore, apparent that polymerizations carried out in acid media such as are provided in accordance with this invention are advantageous over polymerizations effected in alkaline media. The emulsifying agents of this invention are superior to aliphatic amine salts, which also are capable of effecting polymerizations in acid media, in that the former are more uniform in quality and more economical. Furthermore, as compared to aliphatic amine salts, the salts of the present invention produce more beneficial effects on synthetic rubbers. The tensile strength, flex life, tack and other physical properties are improved through use of the hydroabietylamine and dehydroabietylamine salts.

What I claim and desire to protect by Letters Patent is:

1. The process which comprises polymerizing an organic compound containing the $CH_2=C<$ group and which is capable of being polymerized by a peroxide catalyst, in aqueous emulsion in the presence of a water-soluble salt of an amine selected from the group consisting of hydroabietylamine and dehydroabietylamine as emulsifying agent.

2. The process which comprises copolymerizing at least two organic compounds containing the $CH_2=C<$ group and which are capable of being polymerized by a peroxide catalyst, in aqueous emulsion in the presence of a water-soluble salt of an amine selected from the group consisting of hydroabietylamine and dehydroabietylamine as emulsifying agent.

3. The process which comprises polymerizing an organic compound containing the $CH_2=C<$ group and which is capable of being polymerized by a peroxide catalyst, in aqueous emulsion in the presence of a water-soluble salt of hydroabietylamine as emulsifying agent.

4. The process which comprises polymerizing an organic compound containing the $CH_2=C<$ group and which is capable of being polymerized by a peroxide catalyst, in aqueous emulsion in the presence of a water-soluble salt of dehydroabietylamine as emulsifying agent.

5. The process which comprises polymerizing an organic compound containing the $CH_2=C<$ group and which is capable of being polymerized by a peroxide catalyst, in aqueous emulsion in the presence of hydroabietylamine acetate as emulsifying agent.

6. The process which comprises polymerizing an organic compound containing the $CH_2=C<$ group and which is capable of being polymerized by a peroxide catalyst, in aqueous emulsion in the presence of dehydroabietylamine chloride as emulsifying agent.

7. The process which comprises polymerizing an organic compound containing the $CH_2=C<$ group and which is capable of being polymerized by a peroxide catalyst, in aqueous emulsion in the presence of dehydroabietylamine acetate as emulsifying agent.

8. The process which comprises polymerizing in aqueous emulsion a conjugated butadiene hydrocarbon in the presence of a water-soluble salt of an amine selected from the group consisting of hydroabietylamine and dehydroabietylamine as emulsifying agent.

9. The process which comprises copolymerizing a mixture of a conjugated butadiene hydrocarbon and another organic compound containing the $CH_2=C<$ group and which is capable of being polymerized by a peroxide catalyst, in aqueous emulsion in the presence of a water-soluble salt of an amine selected from the group consisting of hydroabietylamine and dehydroabietylamine as emulsifying agent.

10. The process which comprises copolymerizing in aqueous emulsion a mixture of butadiene-1,3 and styrene in the presence of a water-soluble salt of an amine selected from the group consisting of hydroabietylamine and dehydroabietylamine as emulsifying agent.

11. The process which comprises copolymerizing in aqueous emulsion a mixture of butadiene-1,3 and acrylonitrile in the presence of a water-soluble salt of an amine selected from the group consisting of hydroabietylamine and dehydroabietylamine as emulsifying agent.

12. The process which comprises polymerizing in aqueous emulsion a conjugated butadiene hydrocarbon in the presence of dehydroabietylamine acetate as emulsifying agent.

13. The process which comprises copolymerizing in aqueous emulsion a mixture of butadiene-1,3 and styrene in the presence of hydroabietylamine acetate as emulsifying agent.

14. The process which comprises copolymerizing in aqueous emulsion a mixture of butadiene-1,3 and acrylonitrile in the presence of dehydroabietylamine chloride as emulsifying agent.

ARTHUR E. DRAKE.

REFERENCES CITED

The following references are of record in the file of this patent:

UNITED STATES PATENTS

| Number | Name | Date |
|---|---|---|
| 2,002,622 | Williams | May 28, 1935 |
| 2,382,812 | Parker | Aug. 14, 1945 |
| 2,391,233 | Gruber | Dec. 18, 1945 |
| 2,393,133 | White | Jan. 15, 1946 |